March 13, 1956        A. C. ALLEN        2,737,813
APPARATUS FOR INDICATING THE CHARACTERISTICS
OF UNBALANCE IN ROTATABLE MASSES
Filed May 24, 1952        2 Sheets-Sheet 1
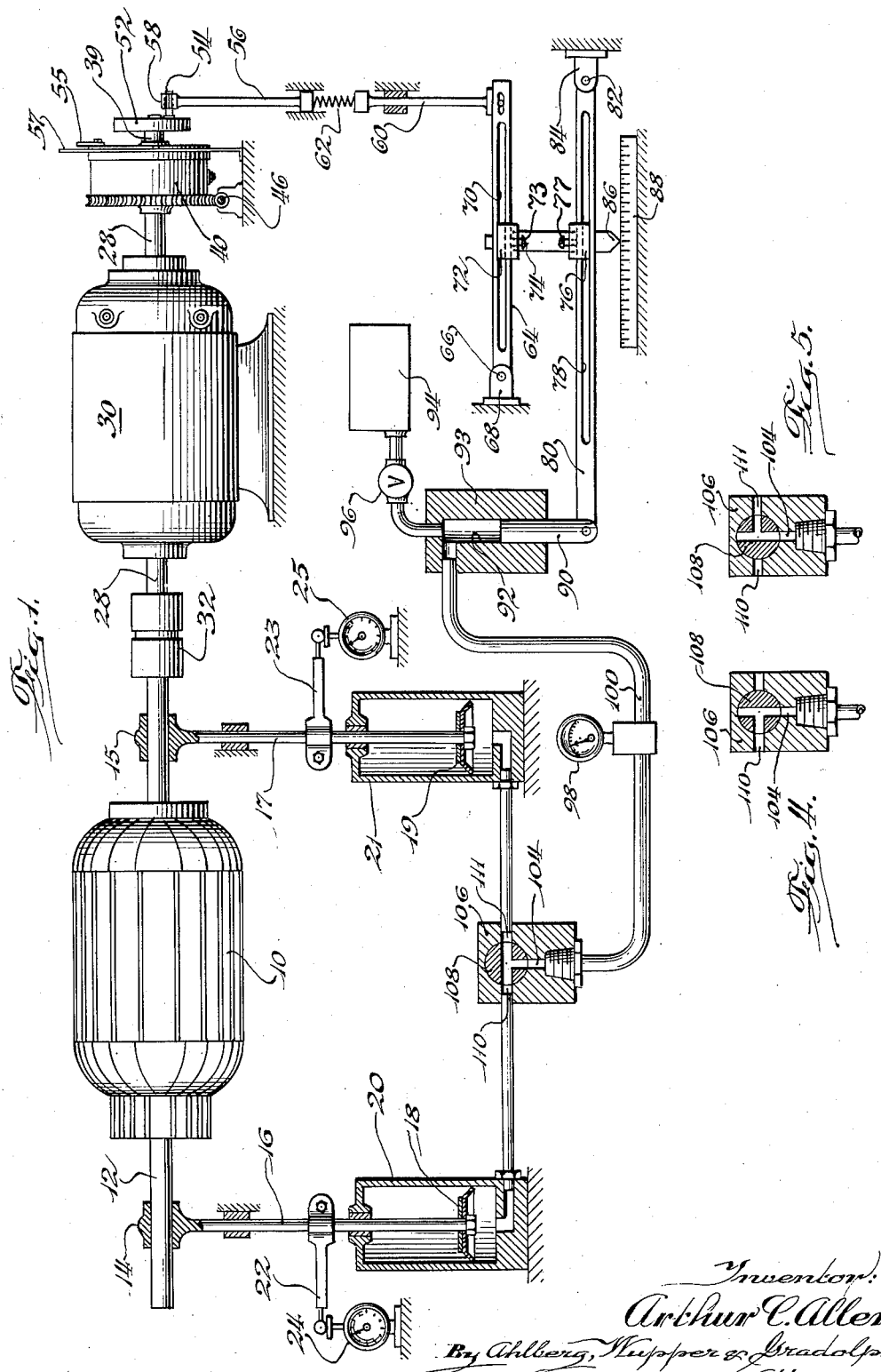

United States Patent Office 2,737,813
Patented Mar. 13, 1956

2,737,813

APPARATUS FOR INDICATING THE CHARACTERISTICS OF UNBALANCE IN ROTATABLE MASSES

Arthur C. Allen, Chicago, Ill., assignor to Stewart-Warner Corporation, Chicago, Ill., a corporation of Virginia Application May 24, 1952, Serial No. 289,919

13 Claims. (Cl. 73—468)

My invention relates generally to out of balance indicators, and more particularly to apparatus for indicating the angular position and amount of unbalance of a rotatable mass. From these indications the operator may determine the angular position at which weight is to be added to, or subtracted from, the rotatable mass to obtain static balance of the mass, and additionally determine the position along the axis of rotation at which weight is to be added to, or subtracted from, the mass to secure dynamic balance of the mass.

It is therefore an object of my invention to provide an improved means for indicating the degree of unbalance of a rotatable mass and the angular position of the center of gravity of the mass with respect to its axis of rotation.

A further object is to provide an apparatus of the above mentioned character, in which the degree and the angular position of the unbalance of a mass is determined by the null method, using hydraulic means to apply forces to the mass to counteract the forces generated by the out of balance condition of the rotating mass.

Other objects will become apparent from the following description, reference being had to the accompanying drawings, in which Fig. 1 is a diagrammatic view of the apparatus;

Fig. 4 is a diagrammatic view of the control valve showing it in the position when the apparatus is being used to determine the left-hand dynamic unbalance of the rotating mass; and Fig. 5 is a view similar to Fig. 3 showing the valve positioned for determining the right-hand dynamic balance of the mass.

Figure 3:
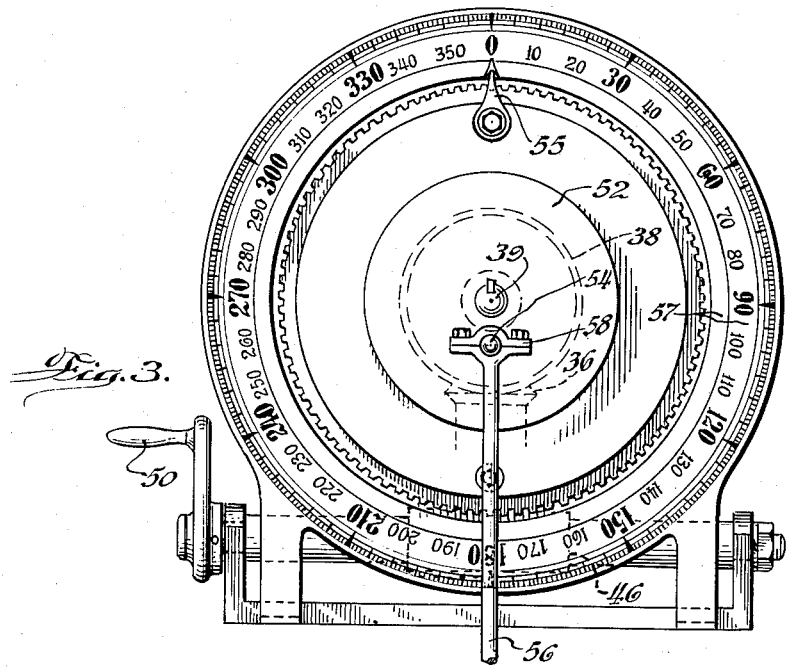
Fig. 3 is an end elevational view of the protractor.
Figure 2:
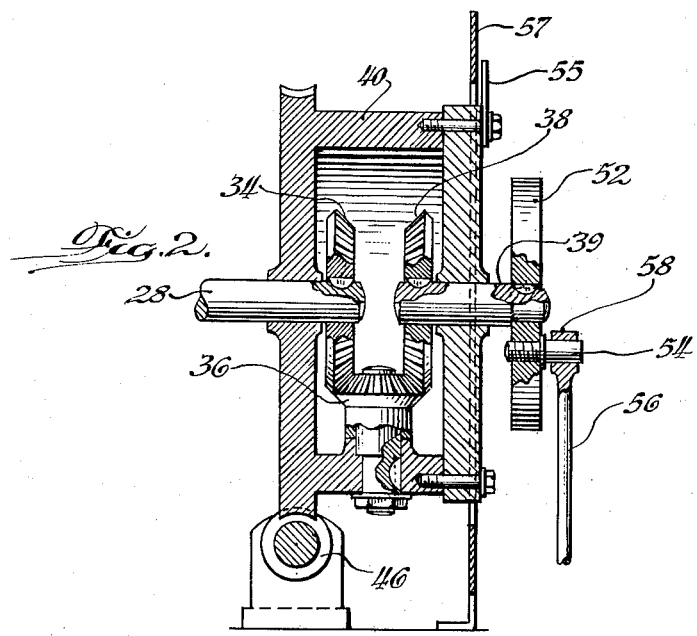
Fig. 2 is a fragmentary sectional view of a planetary gearing used to drive the hydraulic apparatus.

Referring to Fig. 1, the mass to be balanced is illustrated as a motor or dynamo rotor 10 mounted upon its shaft 12. The left-hand portion of the shaft 12 is mounted in a suitable bearing 14 carried by a suitably guided piston rod 16 connected to a piston 18 reciprocable within a cylinder 20. A bearing 15 for the right-hand end portion of the shaft 12 is carried by a suitably guided piston rod 17 secured to a piston 19 reciprocable in a cylinder 21. The pistons 18 and 19 and cylinders 20 and 21 are simple illustrations of any suitable hydraulic actuators. Suitably housed diaphragms or bellows are satisfactory.

An arm 22 is clamped to the piston rod 16, while a similar arm 23 is clamped to the piston rod 17, these arms being provided to operate dial indicators 24 and 25. These indicators are not absolutely essential, because the degree of vibration may usually be sufficiently accurately estimated by the tactile sense.

The shaft 12 is connected to one end of a rotor shaft 28 of a driving motor 30 by a flexible coupling or universal joint 32. The other end of the shaft 28 carries a bevel gear 34 which is in mesh with one or more planetary bevel pinions 36, the latter meshing with a second bevel gear 38 secured to the end of a shaft 39. The planetary gear or gears 36 are mounted for free rotation in a suitable housing 40. The housing 40 has an external worm wheel which is engaged by a suitably mounted worm 46, rotatable by a handle 50. A phasing protractor plate or disc 52 is secured to the end of the shaft 39 and carries an eccentric pin 54. The shafts 28 and 39 rotate at the same speed but in opposite directions. If desired, an additional gear may be included in the gear train so that these shafts rotate in the same direction to simplify the interpretation of the results of the tests.

The housing 40 is provided with an indicating pointer 55 cooperable with a suitably mounted scale 57, graduated from 0° to 360°. This planetary drive, together with its associated parts, constitutes a rotary phase changing mechanism.

A connecting rod 56, having its lower end suitably guided, has its upper end secured to a bearing 58 surrounding the eccentric pin 54, and is connected to a suitably guided rod 60 by a resilient member 62, which may be in the form of a compression coil spring. The rod 56 transmits to one end of the spring 62 one diametrical component of the rotary motion of the eccentric pin 54. Thus actuated, the spring 62 applies to the rod 60 a cyclic or sinusoidal force, which approximates a sinusoidal function of the rotary speed of the eccentric 54. The rod 60 is pivoted to the end of an operating arm 64 which is pivoted by a pin 66 to a fixed bracket 68. The arm 64 has an elongated slot 70 formed therein, in which a block 72 is slidable. The block 72 is pivotally secured to the upper end of a sine bar or link 74 which has an additional block 76 pivotally secured to its lower end, the block 76 being slidable in an elongated slot 78 formed in an arm 80 which is pivoted at 82 to a fixed bracket 84. The lower end of the sine bar 74 has a pointer 86 cooperating with a suitable fixed graduated scale 88. The blocks 72 and 76 can be provided with set screws 73 and 77 or the like to clamp the arms 64 and 80 and hold the blocks in any position. This linkage forms a means for changing the mechanical advantage, or leverage, of the force applied by the spring 62 and transmitted to the arm 80.

The arm 80 has a plunger 90 pivoted to its left-hand end, the plunger operating in a cylinder 92 forming a chamber in a block 93 to which suitable hydraulic fluid may be admitted from a reservoir 94, in which the fluid is stored under pressure, by manual operation of a valve 96. The cylinder 92 is connected to a pressure gage 98 by a suitable conduit 100 which also connects the cylinder to one port 104 of a three-way valve body 106 in which a three-way valve 108 is rotatable. The other ports 110 and 111 are respectively connected to the lower ends of cylinders 20 and 21. A bellows or diaphragm may be substituted for the piston and cylinder as the pumplike fluid pressure applying means for translating the mechanical force into pulsating hydraulic pressure.

In using the apparatus to determine the extent of static unbalance of a mass, such as the rotor 10, the valve 108 is set to the position shown in Fig. 1, and assuming that all air has been bled from the system, the motor 30 is energized through a suitable variable speed control, and the mass 10 rotated at increasing speed until its frequency of resonance is reached, at which the vibration is greatest, as noted from the indications of the dial indicators 24 and 25.

The sine bar 74 which, it will be noted, forms a variable leverage, or variable mechanical advantage, driving connection between arms 64 and 80, is initially at its left-hand end position nearest the pivot 66, assuring a minimum motion of the plunger 90. The worm 46 is then rotated to the position such that the vibration indicated by the dial indicators 24 and 25 is at its maximum. Thereafter, or contemporaneously therewith, the sine bar 74 is moved toward the right until the dial indicators 24 and 25 no longer indicate appreciable vibration of the shaft 12.

The adjustment of the position of the housing 40 by means of the worm 46, and the adjustment of the position of the sine bar, may have to be repeated until the forces acting upon the mass 10, 12 (due to the fact that its center of gravity is not within the axis of rotation), are exactly balanced by the forces acting on the pistons 18 and 19, due to the cyclical changes in pressure in cylinder 92. The angular position of the housing 40, as it may be read from the dial 57, will indicate the angular position of the unbalance in the mass 10, 12, and the position of the pointer 86 and the reading of the gage 98 will serve as indications of the degree of unbalance. It will be understood that the provision of the resilient connection 62 between rods 56 and 60 makes possible the continued rotation of the plate 52 even though the movements of the arms 64 and 78 and the plunger 90 are very small. As the hydraulic forces applied to the bearings 14 and 15 become equal to and in phase opposition to those applied to these bearings due to the unbalanced condition of the mass 10, the motion of the plunger 90 and of the parts mechanically connected thereto becomes very minute. It is then mainly the changing degree of compression of the resilient member 62 which results in corresponding changes in the hydraulic pressure in the cylinders 20 and 21, to provide the forces on the bearings 14 and 15 which are equal and opposite to those resulting from the unbalance of the mass 10. The plunger 90 and its cylinder 92 are thus means for translating into hydraulic pressure the force transmitted through the mechanical force transmitting linkage.

Weight may then be removed from or added to the mass 10, in accordance with these indications, to compensate for the unbalance condition.

In the event that the mass 10 is one in which metal may be removed more or less indiscriminately (for example, if the mass is a flywheel), metal may be removed by a drilling operation, the position of the hole to be drilled being automatically determined by the position of the housing 40, and the depth of the hole to be drilled may be automatically determined by the maximum indication of the gage 98, or the position of the sine bar 74, or the drilling operation may be manually performed. The position of the sine bar 74 to which it is finally adjusted to obtain apparent balance of the mass 10, 12, bears a direct relation to the indication of the gage 98 under these conditions.

In cases where it is feasible to add weights to the mass 10, the weights may be added diametrically opposite the position indicated by the position of the housing 40 relative to the dial 57.

If it is desired to balance the mass 10 dynamically, in addition to securing static balance, additional operations must be performed. The three-way valve 108 is moved to the position shown in Fig. 4. The same operations as for determining static balance, are repeated with the valve 108 in this position, and the indications of the degree and angular position of the unbalance is recorded. Then these operations are repeated with the valve 108 in the position in which it is shown in Fig. 5, and the indications recorded. From this recorded data, the angular and longitudinal coordinates of the place at which weight should be added to or removed from the mass 10, 12, as well as the quantitative value of such weight, may be computed without difficulty.

The pistons 18, 19, and the cylinders 20, 21, or their equivalents are referred to as "hydraulic actuators" in some of the claims.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In an apparatus for indicating the angular position and degree of unbalance of a rotatable mass; the combination of a pair of spaced bearings for supporting the mass for rotation; hydraulic actuators supporting said bearings; a variable speed motor for rotating the mass; a flexible universal coupling for connecting the motor to the rotatable mass; a hydraulic pressure producing device connected to the hydraulic actuators; a force transmitting connection between the motor and the pressure producing device, said connection including a manually operated rotary phase changing mechanism, an adjustable mechanical advantage changing mechanism, and a resilient force transmitting member; a pressure gauge connected to the hydraulic actuators; and means for indicating the degree of phase change introduced by the phase changing mechanism.

2. In an apparatus for indicating the angular position and degree of unbalance of a rotatable mass; the combination of a pair of spaced bearings for supporting the mass for rotation; hydraulic actuators supporting said bearings; a variable speed motor for rotating the mass; a flexible universal coupling for connecting the motor to the rotatable mass; a hydraulic pressure producing device connected to the hydraulic actuators; a force transmitting connection between the motor and the pressure producing device, said connection including a manually operated rotary phase changing mechanism, an adjustable mechanical advantage changing mechanism, and a resilient force transmitting member; means for indicating the position of adjustment of the mechanical advantage changing mechanism; and means for indicating the degree of phase change introduced by the phase changing mechanism.

3. In an apparatus for indicating the angular position and degree of unbalance of a rotatable mass; the combination of a pair of spaced bearings for supporting the mass for rotation; hydraulic actuators supporting said bearings; a variable speed motor for rotating the mass; a flexible universal coupling for connecting the motor to the rotatable mass; a hydraulic pressure producing drive connected to the hydraulic actuators; a force transmitting connection between the motor and the pressure producing device, said connection including a manually operated rotary phase changing mechanism, an adjustable mechanical advantage changing mechanism, and a resilient force transmitting member; means for indicating the angular position of said phase changing mechanism; and means for indicating the degree of force applied to said actuators.

4. The combination set forth in claim 1 which includes a three-way valve means for connecting the pressure producing device to both of the hydraulic actuators or individually to either of the hydraulic actuators.

5. In an apparatus for indicating the angular position and degree of unbalance of a rotatable mass; the combination of a pair of spaced bearings for supporting the mass for rotation; hydraulic actuators supporting said bearings; a variable speed motor for rotating the mass; a flexible universal coupling for connecting the motor to the rotatable mass; means, translating a mechanical force into hydraulic pressure, hydraulically connected to the hydraulic actuators; a force transmitting connection between the motor and the force to hydraulic pressure translating means, said connection including a manually operated rotary phase changing mechanism, an adjustable mechanical advantage changing mechanism, and a resilient force transmitting member; a hydraulic pressure indicator connected to the hydraulic actuators; and means for indicating the degree of phase change introduced by the phase changing mechanism.

6. In an apparatus for indicating the angular position and degree of unbalance of a rotatable mass; the combination of a pair of spaced bearings for supporting the mass for rotation; hydraulic actuators supporting said bearings; means for rotating the mass at variable speed; fluid pressure applying means for translating a mechanically transmitted force into hydraulic pressure, said fluid pressure applying means being hydraulically connected to the hydraulic actuators; a force transmitting connection between the mass rotating means and said pressure applying means, said connection including a manually operable rotary phase changing mechanism, an adjustable mechanical advantage changing mechanism, and a resilient force transmitting member; means for indicating the position of adjustment of the mechanical advantage changing mechanism; and means for indicating the degree of phase change introduced by the phase changing mechanism.

7. In an apparatus for indicating the angular position of unbalance of a rotatable mass; the combination of a pair of spaced bearings for supporting the mass for rotation; hydraulic actuators supporting said bearings; a variable speed motor for rotating the mass; a flexible universal coupling for connecting the motor to the rotatable mass; a hydraulic pressure producing device hydraulically connected to the hydraulic actuators; a force transmitting connection between the motor and the pressure producing device, said connection including a manually operated rotary phase changing mechanism, and a resilient force transmitting member; and means for indicating the degree of phase change introduced by the phase changing mechanism.

8. In an apparatus for indicating the degree of unbalance of a rotatable mass; the combination of a pair of spaced bearings for supporting the mass for rotation; hydraulic actuators supporting said bearings; a variable speed power source for rotating the mass; a flexible universal coupling for connecting the power source to the rotatable mass; a hydraulic pressure producing device connected to the hydraulic actuators; means for driving the pressure producing device in an opposed phased relation to the cyclic forces applied to the actuators by the rotating mass, said driving means including an adjustable mechanical advantage changing mechanism, and a resilient force transmitting member; and means for indicating the position of adjustment of the mechanical advantage changing mechanism.

9. In an apparatus for indicating the angular position of unbalance of a rotatable mass; the combination of a pair of spaced bearings for supporting the mass for rotation; hydraulic actuators supporting said bearings; a variable speed motor for rotating the mass; a coupling forming a driving connection from the motor to the rotatable mass; a hydraulic pressure producing device; means connected between said pressure producing device and said hydraulic actuators for selectively transmitting the pressure variations produced by said hydraulic pressure producing device to both of said hydraulic actuators or individually to either of them; a force transmitting connection between the motor and the pressure producing device, said connection including a manually operated rotary phase changing mechanism and a resilient force transmitting member; and means for indicating the degree of phase change introduced by the phase changing mechanism.

10. Apparatus for determining the state of unbalance of a rotary body, comprising, in combination, movable bearing means for supporting the body, means for rotating the body in said bearing means, fluid actuating means connected to said bearing means to oppose cyclic forces applied thereto by unbalanced mass in the body, a reciprocable pumplike fluid pressure producing device communicating with said actuating means, a mechanical drive for said pressure producing device including an eccentric actuator, means for driving said actuator in timed relation to the body, means for transmitting generally sinusoidal forces from said eccentric actuator to said pressure producing device, means for changing the phase relation of said eccentric actuator to the body, and means for indicating the degree of force applied to said fluid actuating means.

11. Apparatus for determining the angular position and degree of unbalance of a rotary body, comprising, in combination, movable bearing means for supporting the body, means for rotating the body in said bearing means, fluid actuating means connected to said bearing means to oppose vibratory forces applied thereto from unbalanced mass in the rotary body, fluid pressure applying means including a chamber communicating with said actuating means and mechanical means for positively forcing fluid under pressure from said chamber, an eccentric actuator for said pressure applying means, means for driving said actuator in a phased relation to the body, means for changing the phase relation of said actuator to the body, means for transmitting generally sinusoidal actuating force from said eccentric actuator to said pressure applying means, and means for varying the mechanical advantage of said sinusoidal actuating force of said eccentric actuator on said pressure producing means.

12. Apparatus for determining the state of unbalance of a rotary body, comprising, in combination, movable bearing means for supporting the body, drive means for rotating the body in said bearing means, hydraulic actuators connected to said bearing means to oppose cyclic centrifugal forces applied thereto by unbalanced mass in the body, reciprocable pumplike fluid pressure producing means communicating with said actuating means, means for driving said pressure producing means in a phased relation to the body, adjustable means in said driving means for said pressure producing means for varying the phase of the latter in relation to the body, and means for indicating the force applied to said hydraulic actuating means.

13. Apparatus for determining the state of unbalance of a rotary body, comprising, in combination, yieldably mounted bearing means for supporting the body, drive means for rotating the body in said bearing means, hydraulic actuating means connected to said bearing means to oppose vibrational forces thereon from unbalanced mass in the body, pulsating pumplike fluid pressure producing means communicating with said actuating means, drive means for said pressure producing means including an eccentric actuator, means for driving said actuator in a phased relation to the body, planetary gear means interposed between said eccentric actuator and said drive means therefor to controllably change the phase relation of said eccentric actuator to the body, means for transmitting sinusoidal forces from said eccentric actuator to said pressure producing means, and means for indicating the force applied to said hydraulic actuating means.

References Cited in the file of this patent

UNITED STATES PATENTS

| | | |
|---|---|---|
| 1,553,941 | Kasley | Sept. 15, 1925 |
| 1,639,444 | Terry | Aug. 16, 1927 |
| 1,689,672 | Kasley | Oct. 30, 1928 |